(No Model.)

C. L. DREHER.
DEVICE FOR CLOSING BREAKS IN ELASTIC MATERIALS.

No. 513,990. Patented Feb. 6, 1894.

WITNESSES:

INVENTOR,
CHARLES L. DREHER
BY
ATTORNEY.

UNITED STATES PATENT OFFICE.

CHARLES L. DREHER, OF MERIDEN, CONNECTICUT.

DEVICE FOR CLOSING BREAKS IN ELASTIC MATERIALS.

SPECIFICATION forming part of Letters Patent No. 513,990, dated February 6, 1894.

Application filed March 11, 1892. Renewed November 13, 1893. Serial No. 490,845. (No model.)

*To all whom it may concern:*

Be it known that I, CHARLES L. DREHER, a citizen of the United States, residing at Meriden, in the county of New Haven and State of Connecticut, have invented a certain new and useful Improvement in Devices for Closing Breaks in Elastic Materials, of which the following is a specification.

My invention has relation to improvements in means for hermetically closing punctures and holes in elastic substances, such as india rubber, and has for its especial object the closing of holes and leaks in pneumatic bicycle tires.

To the aforesaid objects my invention consists in the peculiar and novel device hereinafter described and then specifically claimed; reference being had to the accompanying drawings, constituting a part of this specification.

Figure 1:
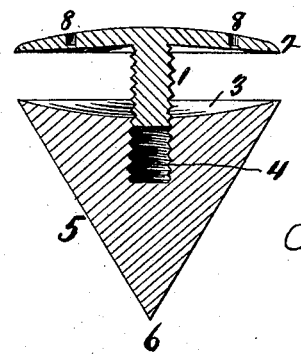
Figure 2:
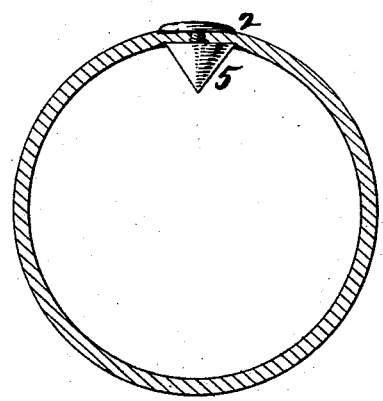
Figure 4:
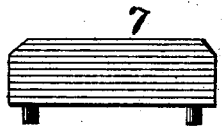
Figure 3:
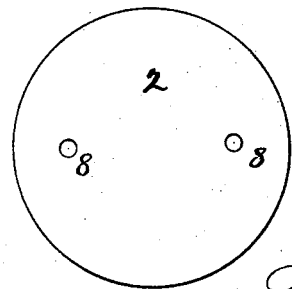

In the accompanying drawings, in which similar reference numerals indicate like parts in the different figures, Figure 1, is a central vertical section of the cap and socket; Fig. 2, an elevation of my improvement while in use, the piece of rubber bicycle tire shown in section; Fig. 3, a plan of the cap shown in Fig. 1; and Fig. 4, an elevation of a wrench used in operating this device.

Referring to the drawings Fig. 1, represents a screw-threaded shank 1, surmounted by a head, 2, made integral therewith, the shape of said head being substantially in the form of a meniscus. In the top or convex side of this head 2, are two shallow holes 8, (shown in Fig. 3,) for a purpose to be stated. The socket shown in section in Fig. 1, is in form a perfect cone, inverted, whose base 3, is slightly concave, in the center of which concavity is a hole 4, extending into the body of the socket and toward the point 6, internally screw-threaded to receive the shank 1.

The operation of the device is as follows: Suppose a puncture in a rubber bicycle tire is to be closed. The shank 1, is first partially screwed into the hole 4, of the cone 5. Then the point 6, is forced through the orifice in the tire until it passes the base 3, and contracts by its inherent elasticity around the shank 1, as shown in Fig. 2. Thereupon the wrench 7 is applied to the holes in the cap 2, and it is screwed down toward the socket, thereby compressing the rubber between the socket and cap tightly and making an air tight joint. The cap and socket are preferably made of metal, as brass, but may be of any analogous material.

I claim as my invention—

1. A pneumatic tire repairer consisting of a flat head having a screw-threaded shank extending from one face combined with a conical head having a screw-threaded opening in its base to receive said screw, substantially as shown and described.

2. In a pneumatic tire repairer a flat head slightly concave on one side and having a screw-threaded shank extending from its concave face, combined with a conical head having a concave base, and a screw-threaded opening in said base to receive said shank, substantially as shown and described.

3. The meniscus-shaped head having a screw-threaded shank extending from its concave face and provided on its convex face with means, as holes, to receive a driving tool, combined with a conical head having a concave base and a screw-threaded opening in said base to receive said shank, substantially as shown and described.

In testimony that I claim the above I hereunto set my hand.

CHARLES L. DREHER.

In presence of—
C. E. HUMPHREY,
GEO. M. WRIGHT.